C. SCHACHTSCHNEIDER.
SAW SET.
APPLICATION FILED FEB. 18, 1908.

968,986.

Patented Aug. 30, 1910.

WITNESSES:

INVENTOR
C. Schachtschneider
BY
Attorneys

UNITED STATES PATENT OFFICE.

CARL SCHACHTSCHNEIDER, OF SNOHOMISH, WASHINGTON.

SAW-SET.

968,986.   Specification of Letters Patent.   Patented Aug. 30, 1910.

Application filed February 18, 1908. Serial No. 416,518.

*To all whom it may concern:*

Be it known that I, CARL SCHACHTSCHNEIDER, a citizen of the United States, residing at Snohomish, in the county of Snohomish and State of Washington, have invented certain new and useful Improvements in Saw-Sets; and I do hereby declare the following to be a full, clear, and exact description of the invention, such as will enable others skilled in the art to which it appertains to make and use the same.

My invention relates to new and useful improvements in saw sets and is adapted to be used for setting the points of saw teeth and my object is to provide a device of this class which may be quickly applied in position on the points of the teeth.

A further object is to provide means for separating or closing the jaws of the setting device and a still further object is to provide means for positively clamping the jaws on the teeth when said teeth are being set.

Other objects and advantages will be hereinafter referred to and more particularly pointed out in the claim.

Figure 1:
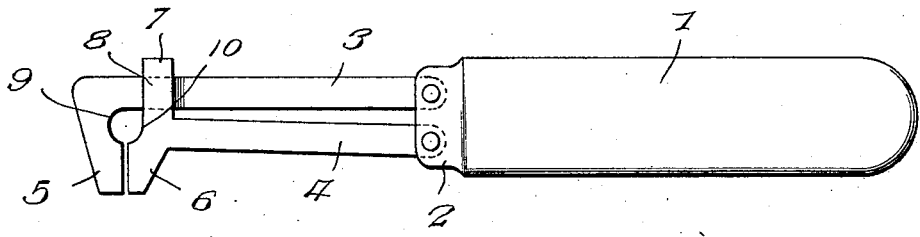
Figure 2:
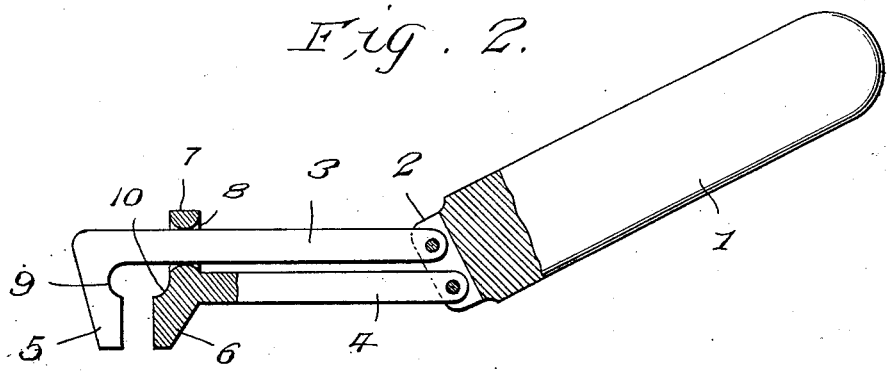

In the accompanying drawings which are made a part of this application, Figure 1 is a side elevation of my improved saw set in its closed position, and, Fig. 2 is a similar view partly in section showing the parts of the device when the jaws are in their open position.

Referring to the drawings in which similar reference numerals designate corresponding parts throughout the several views, 1 indicates a handle, at one end of which are provided a pair of elongated ears 2, between which are pivotally mounted shanks 3 and 4, the shank 3 being pivoted adjacent the upper ends of the ears 2 and the shank 4 adjacent the lower ends thereof, the shanks 3 and 4 being provided at their outer ends with coöperating jaws 5 and 6, respectively, the jaw 6 being held in alinement with the jaw 5 by extending a loop 7 around the shank 3 and forming said loop integral with the shank 4, the upper and lower face of said loop having rounded surface 8, whereby the shank 3 will be permitted to rock in the loop.

The jaws 5 and 6 are provided adjacent their upper ends with recesses 9 and 10 to form an opening or space, into which the extreme upper end of the tooth is to extend when the lower portion of the tooth is to be set rendering it possible to operate on the lower portion of the tooth without affecting the upper end thereof. The jaws are separated or moved toward each other by retaining the shanks 3 and 4 in a fixed position and moving the handle 1 upwardly or downwardly, the upward movement of the handle moving the pivot points of the shanks out of vertical alinement and separating the jaws and when the jaws are placed at opposite sides of the tooth, the handle is lowered and the pivot points of the shanks brought into vertical alinement or until the jaws are clamped on the tooth, when by continued downward pressure on the handle, the tooth is set at the proper angle and the greater the downward pressure on the handle, the firmer the jaws are clamped on the teeth.

It will thus be seen that I have provided a very cheap and economical form of saw set and one that can be readily and quickly applied to use, and it will likewise be seen that the lower portion of the tooth may be operated upon without affecting the upper end thereof.

What I claim is:

A device of the character described, comprising a handle member, elongated shanks having their inner ends pivotally connected to said handle member at opposite points thereon, said shanks having jaws, the faces of which are arranged in parallel planes with each other, said shanks also having concaved recesses therein at points immediately above the upper ends of the faces of said jaws, one of said shanks also having an upstanding loop just in rear of a line passing vertically through its recess, said loop receiving the opposite shank and having the opposed inner surfaces thereof rounded and forming bearings for the received shank.

In testimony whereof I have signed my name to this specification in the presence of two subscribing witnesses.

CARL SCHACHTSCHNEIDER.

Witnesses:
J. M. DOYLE,
T. R. RILEY.